(12) United States Patent
Cornell (10) Patent No.: US 8,730,258 B1
(45) Date of Patent: May 20, 2014

(54) ANTI-ALIASING OF STRAIGHT LINES WITHIN A MAP IMAGE

(75) Inventor: Brian Cornell, Kenmore, WA (US)

(73) Assignee: Google Inc., Mountain View, CA (US)

(*) Notice: Subject to any disclaimer, the term of this patent is extended or adjusted under 35 U.S.C. 154(b) by 377 days.

(21) Appl. No.: 13/174,320

(22) Filed: Jun. 30, 2011

(51) Int. Cl.
*G09G 5/00* (2006.01)
*G06T 11/20* (2006.01)

(52) U.S. Cl.
USPC .......................................... 345/611; 345/443

(58) Field of Classification Search
None
See application file for complete search history.

(56) References Cited

U.S. PATENT DOCUMENTS

| | | | | |
|---|---|---|---|---|
| 4,612,540 | A * | 9/1986 | Pratt .............................. | 345/690 |
| 5,243,695 | A * | 9/1993 | Russell et al. ................ | 345/443 |
| 6,133,901 | A * | 10/2000 | Law ............................... | 345/611 |
| 6,329,977 | B1 * | 12/2001 | McNamara et al. .......... | 345/589 |
| 2005/0068321 | A1 * | 3/2005 | Jiao et al. ..................... | 345/443 |

OTHER PUBLICATIONS

Fernando et al. "The Cg Tutorial", ISBN;978032154398 2003.*
"Shaders in OpenGL" available online @ http://www.cs.arizona.edu/classes/cs433/spring12/ShaderIntro.pdf since Nov. 2009.*
Gupta et al. "Filtering Edges for Gray-Scale Displays", Computer Graphics vol. 15 No. 3 Aug. 1981.*
McMcNamara et al. "Prefiltered Antialised Lines Using Half-Plane Distance Functions" Proceeding HWWS '00 Proceedings of the ACM SIGGRAPH/EUROGRAPHICS workshop on Graphics hardware pp. 77-85 ACM 2000.*

* cited by examiner

*Primary Examiner* — Tize Ma
*Assistant Examiner* — Yingchun He
(74) *Attorney, Agent, or Firm* — Marshall, Gerstein & Borun LLP (57) ABSTRACT

A graphics or image rendering system, such as a map image rendering system, receives image data from an image database in the form of vector data that defines various image objects, such as roads, boundaries, etc., which are to be rendered as straight lines within an image. The imaging rendering system renders the image objects by applying an anti-aliasing technique that determines varying pixel color values at or near the edges of each straight line to be rendered on the image, so as to obtain a pleasing visual effect when rendering a road or other boundary in any orientation on the image screen. The anti-aliasing technique determines a scaling vector having values dependent on the location of a particular pixel in the image along the normal to the straight line forming a road and determines a pixel color value at each pixel location associated with the road based on this scaling vector, such that the pixel color value at each pixel in or near the line is proportional to a component of the scaling vector. This technique produces a more gradual transition in pixel color values from a non-road location to a road location in the image, and thus provides a non-aliased rendering of the road regardless of the orientation or direction in which the road is being rendered in the image.

39 Claims, 4 Drawing Sheets

ANTI-ALIASING OF STRAIGHT LINES WITHIN A MAP IMAGE

FIELD OF TECHNOLOGY

The present disclosure relates to image rendering systems, such as electronic map display systems, and more specifically to an image rendering engine that performs anti-aliasing on straight lines within a map image.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of raster or pixelated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects or elements (also referred to as primitives) to be displayed as part of an image via an image display device. In the context of a map image, such image elements or primitives may be, for example, individual roads or road segments, text labels, areas, text boxes, buildings, points of interest markers, terrain features, bike paths, map or street labels, etc. Each image element is generally made up or drawn as a set of one or more triangles (of different sizes, shapes, colors, fill patterns, etc.), with each triangle including three vertices interconnected by lines. Thus, for any particular image element, the image database stores a set of vertex data points, with each vertex data point defining a particular vertex of one of the triangles making up the image element. Generally speaking, each vertex data point includes data pertaining to a two-dimensional or a three-dimensional position of the vertex (in an X, Y or an X, Y, Z coordinate system, for example) and various vertex attributes defining properties of the vertex, such as color properties, fill properties, line width properties for lines emanating from the vertex, etc.

During the image rendering process, the vertices defined for various image elements of an image to be rendered are provided to and are processed in one or more image shaders which operate in conjunction with a graphics processing unit (GPU), such as a graphics card or a rasterizer, to produce a two-dimensional image on a display screen. Generally speaking, an image shader is a set of software instructions used primarily to calculate rendering effects on graphics hardware with a high degree of flexibility. Image shaders are well known and various types of image shaders are available in various application programming interfaces (APIs) provided by, for example, OpenGL and Direct3D, to define special shading functions. Basically, image shaders are simple programs in a high level programming language that describe or determine the traits of either a vertex or a pixel. Vertex shaders, for example, define the traits (e.g., position, texture coordinates, colors, etc.) of a vertex, while pixel or fragment shaders define the traits (color, z-depth and alpha value) of a pixel. A vertex shader is called for each vertex in an image element or primitive so that, for each vertex input into the vertex shader, the vertex shader produces one (updated) vertex output. Each vertex output by the vertex shader is then rendered as a series of pixels onto a block of memory that will eventually be sent to a display screen. As another example, fragment shaders use the vertices output by the vertex shaders to pixelate the image, i.e., to determine pixel color values of the image being created. Fragment shaders may fill in or render pixels based on the vertex attribute values of the vertices produced by the vertex shaders by interpolating between the vertex attribute values of different vertices of an image object. In other cases, fragment shaders may use predefined textures in the form of pixel color maps to fill in or to pixelate particular areas defined by the vertices of the image object. In this case, the textures define pixel values for various images to be rendered, and are generally used to apply a material texture (e.g., fur, wood, etc.) to objects or to display pictures on an image screen.

As a more particular example of image shader technology, Direct3D and OpenGL graphic libraries use three basic types of shaders including vertex shaders, geometry shaders, and pixel or fragment shaders. Vertex shaders are run once for each vertex given to the graphics processor. As noted above, the purpose of a vertex shader is to transform a position of a vertex in a virtual space to the two-dimensional coordinate at which it appears on the display screen (as well as a depth value for the z-buffer of the graphics processor). Vertex shaders can manipulate properties such as position, color, and texture coordinates by setting vertex attributes of the vertices, but cannot create new vertices. The output of the vertex shader is provided to the next stage in the processing pipeline, which is either a geometry shader if present or the rasterizer. Geometry shaders can add and remove vertices from a mesh of vertices and can be used to generate image geometry procedurally or to add volumetric detail to existing images that would be too costly to process on a central processing unit (CPU). If geometry shaders are being used, the output is then sent to the rasterizer. Pixel shaders, which are also known as fragment shaders, calculate the color and light properties of individual pixels in an image. The input to this stage comes from the rasterizer, and the fragment shaders operate to fill in the pixel values of the polygons being sent through the graphics pipeline and may use textures to define the pixel values within a particular image object. Fragment shaders are typically used for scene lighting and related effects such as color toning. There is not a one-to-one relationship between calls to the fragment shader and pixels on the screen as fragment shaders are often called many times per pixel because they are called for every image element or object that is in the corresponding space, even if that image object is occluded. However, if the occluding object is drawn first, the occluded pixels of other objects will generally not be processed in the fragment shader.

The use of vector graphics can be particularly advantageous in a mobile map system in which image data is sent from a centralized map database via a communications network (such as the Internet, a wireless communications network, etc.) to one or more mobile or remote devices for display. In particular, vector data, once sent to the receiving device, may be more easily scaled and manipulated (e.g., rotated, etc.) than pixelated raster image data. However, the processing of vector data is typically much more time consuming and processor intensive on the image rendering system that receives the data. Moreover, using vector image data that provides a higher level of detail or information to be displayed in a map leads to a higher number of vector data or vertices that need to be sent to the map rendering system from the map database that stores this information, which can result in higher bandwidth requirements or downloading time in some cases.

In the case of both rasterized map images and vector data generated images, image features that have long straight edges, such as roads, are in many cases disposed at or extend within the image at an angle with respect to the edges of a linear array of pixels used on the display screen to render the image. In some cases, such as in cases in which the edges of the image feature (e.g., line) are long and very straight and extend at only a slight angle to the edges of the pixel field, a phenomena called aliasing occurs. Generally speaking, aliasing results in an image in which the straight edges of lines have sudden or abrupt changes therein, making the edges of the lines look jagged or non-straight, typically in a repetitive manner. While many types of anti-aliasing techniques are known, it can be difficult to perform consistent anti-aliasing of lines within an image, such as in the lines forming a road in a map image, in a manner that can be easily and quickly performed using image vector data.

SUMMARY

A computer-implemented method for rendering a straight line image object on a display device includes using a computer device to receive vector image data identifying a straight line to be rendered within an image on a display device and to determine a desired width for the straight line based on the vector image data, wherein the desired width of the straight line is determined in the direction normal to the straight line. The method also determines an extended width of the straight line to be used in anti-aliasing the straight line when the straight line is rendered in the image on the display device, the extended width of the straight line also being determined in the direction of the normal to the straight line and extending the width of the straight line equally on either side of the straight line. The method additionally determines a scaling vector to be applied to pixel positions along the normal to the line within the extended width of the straight line, using the scaling vector to determine a pixel value for each of the pixel positions along the normal to the straight line within the extended width of the straight line and rendering the straight line in the image on the display device using the determined pixel values at each of the pixel positions along the normal to the straight line within the extended width of the straight line.

If desired, using the scaling vector to determine a pixel value for each of the pixel positions along the normal to the straight line within the extended width of the straight line may include multiplying a component of the scaling vector by a pixel color value for a pixel within boundaries of the straight line to determine the pixel color value at a particular pixel position. Moreover, determining a scaling vector may include determining first and second scaling components extending normal to the straight line but in opposite directions, wherein each of the first and second scaling components has values that range from a first value to a second value, and further including combining the first and second scaling components to produce the scaling vector. In one case, combining the first and second scaling components may include one or more of determining a minimum value of the first and second scaling components at each of a set of locations along the first and second scaling components, limiting the determined minimum value at each of the set of locations along the first and second scaling components between a high value and a low value, such as 0.5 and −0.5, and translating the minimized, limited minimum values at each of the set of locations by a predetermined amount, such as 0.5, to produce the scaling vector.

In another case, determining the first and second scaling components extending normal to the straight line but in opposite directions includes assigning values to the first and second scaling components ranging from a first pre-determined amount at the start of each of the first and second scaling components to a second predetermined amount at the end of each of the first and second scaling components. If desired, the first predetermined amount may be a negative number and the second predetermined amount may be a positive number. Also, determining the first and second scaling components extending normal to the straight line but in opposite directions may include determining a scaling factor and assigning values to the first and second scaling components based on the scaling factor and the width of the straight line. Thus, for example, assigning values to the first and second scaling components may include assigning values to each of the first and second scaling components ranging from the negation of the scaling factor to three times the scaling factor plus the square root of the width of the straight line. If desired, the scaling factor may be set as one-half of the inverse square root of the width of the straight line. In this case, combining the first and second scaling components to produce the scaling vector may include multiplying the values of the first and second scaling components at each of the set of locations along the first and second scaling components to produce a scaling vector component at each of the set of locations. If desired, combining the first and second scaling components to produce the scaling vector may also include limiting the multiplied values of the first and second scaling components at each of the set of locations along the first and second scaling components to be between zero and one.

Moreover, the method may include performing one or more transformations on the line vector image data prior to making a determination of a width of the straight line to be rendered in the image on the display device and/or may include performing one or more transformations on the vector image data after determining the extended width of the straight line.

In another embodiment, an image rendering engine includes a communications network interface, a processor, a memory coupled to the processor, a display device coupled to the processor and a plurality of routines stored in the memory and executable on the processor to perform anti-aliasing of a straight line image object. In particular, a first routine executes on the processor to receive, via the communications network interface, a set of vector data comprising data defining one or more straight line image objects and a second routine executes on the processor to determine an extended width of the straight line to be used in anti-aliasing the straight line when the straight line is rendered in the image on the display device. In this case, the extended width of the straight line is determined in the direction of the normal to the straight line and extends the width of the straight line equally on either side of the straight line. A third routine executes on the processor to determine a scaling vector to be applied to pixel positions along the normal to the line within the extended width of the straight line and a fourth routine executes on the processor to use the scaling vector to determine a pixel value for each of the pixel positions along the normal to the straight line within the extended width of the straight line. A fifth routine executes on the processor to render the straight line in the image on the display device using the determined pixel values at each of the pixel positions along the normal to the straight line within the extended width of the straight line. If desired, the second and third routines may be performed in a vertex shader while the fourth and fifth routines may be performed in a fragment shader.

In another embodiment, a method of rendering a straight line within an image being rendered on a display device includes receiving vector image data identifying a straight line to be rendered within the image on the display device, the vector image data including a pixel value indicative of a pixel color value for pixel positions within the straight line, and determining a desired width of the straight line in the direction normal to the edges of the straight line. The method also includes determining a scaling vector to be applied to pixel positions along the normal to the straight line near the edges of the straight line, using the scaling vector and the pixel value indicative of a pixel color value for pixel positions within the straight line to determine a pixel color value for each of the pixel positions along the normal to the straight line near the edges of the straight line and rendering the straight line in the image on the display device using the determined pixel values at the pixel positions along the normal to the straight line near the edges of the straight line.

DETAILED DESCRIPTION

A graphics or image rendering system, such as a map image rendering system, receives image data from an image database in the form of vector data that defines various image objects, such as roads, boundaries, etc., which are to be rendered as straight lines within an image. The imaging rendering system renders the image objects by applying an anti-aliasing technique that determines varying pixel color values to use at or near the edges of each straight line to be rendered on the image, so as to obtain a pleasing visual effect when rendering a road or other boundary in any orientation on the image screen. The anti-aliasing technique determines a scaling vector having values dependent on the location of a particular pixel in the image along the normal to the straight line forming a road and determines a pixel color value at each pixel location associated with the road based on this scaling vector, such that the pixel color value at each pixel in or near the line is proportional to a component of the scaling vector. This technique produces a more gradual transition in pixel color values from a non-road location to a road location in the image, and thus provides a non-aliased rendering of the road regardless of the orientation or direction in which the road is being rendered in the image on the display device.

Figure 1:
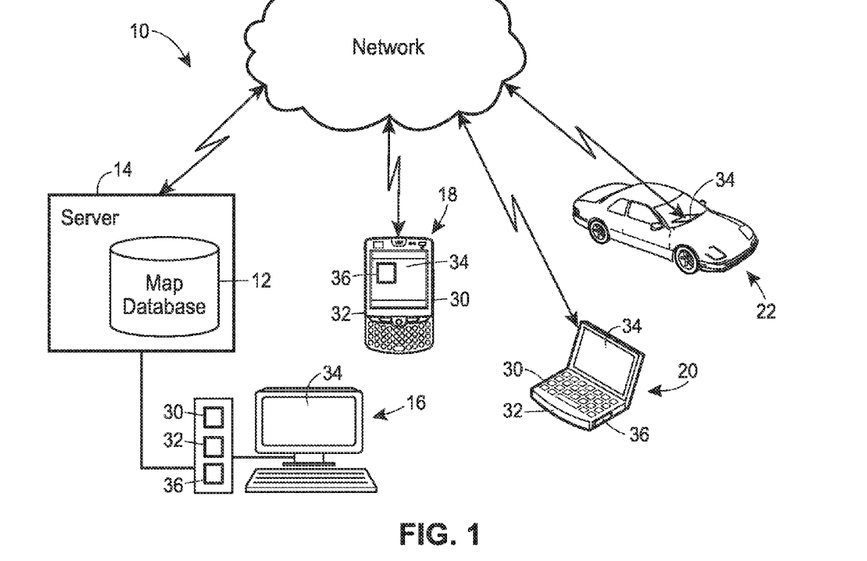
FIG. 1 is a high level block diagram of a map imaging system that implements communications between a map database stored in a server and one or more map image rendering devices.

Referring now to FIG. 1, a map-related imaging system 10 includes a map database 12 stored in a server 14 or in multiple servers located at, for example, a central site or at various different spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless LAN, MAN or WAN, the Internet, or any combination thereof. The map client devices 16-22 may be, for example, mobile phone devices (18), computers such a laptop, desktop or other types of computers (16, 20) or components of other imaging systems such as components of automobile navigation systems (22), etc. Moreover, the client devices 16-22 may be communicatively connected to the server 14 via any suitable communication system, such as any publically available or privately owned communication network, including those that use hardwired based communication structure, such as telephone and cable hardware, and/or wireless communication structure, such as wireless communication networks, including for example, wireless LANs and WANs, satellite and cellular phone communications systems, etc.

The map database 12 may store any desired types or kinds of map data including raster image map data and vector image map data. However, the image rendering systems described herein are best suited for use with vector image data which defines or includes a series of vertices or vertex data points for each of numerous sets of image objects, elements or primitives within an image to be displayed. Generally speaking, each of the image objects defined by the vector data will have a plurality of vertices associated therewith and these vertices will be used to display a map related image object, such as a road object, to a user via one or more of the client devices 16-22.

As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally speaking, the map-related imaging system 10 of FIG. 1 operates such that a user, at one of the client devices 16-22, opens or executes a map application (not shown in FIG. 1) that operates to communicate with and to obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
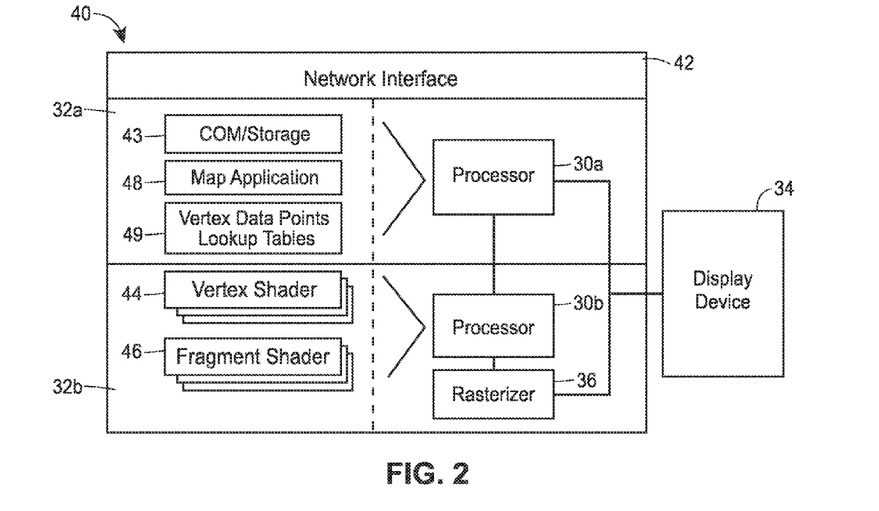
FIG. 2 is a high level block diagram of an image rendering engine used to render map images using map vector data.

Referring now to FIG. 2, an image generation or image rendering device 40 associated with or implemented by one of the client devices 16-22 is illustrated in more detail. The image rendering system 40 of FIG. 2 includes two processors 30A and 30B, two memories 32A and 32B, a user interface or display device 34 and a rasterizer 36. In this case, the processor 30B, the memory 32B and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one or more map applications 48 having map display logic therein stored on the memory 32A, which may be executed on the processor 30A. Likewise one or more image shaders in the form of, for example, vertex shaders 44 and fragment shaders 46 are stored on the memory 32B and are executed on the processor 30B. The memories 32A and 32B may include either or both volatile and non-volatile memory and the routines and shaders are executed on the processors 30A and 30B to provide the functionality described below. The network interface 42 includes any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory portion of the memory 32 for example, that stores vector data received from the map database 12, the vector data including any number of vertex data points.

During operation, the map logic of the map application 48 executes on the processor 30 to determine the particular image data needed for display to a user via the display device 34 using, for example, user input, GPS signals, prestored logic or programming, etc. The display logic or map logic of the application 48 interacts with the map database 12, using the communications routine 43, by communicating with the server 14 through the network interface 42 to obtain map data, preferably in the form of vector data or compressed vector data that is stored in the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30A. In one embodiment, the image data sent from the server 14 includes vector data generally defining data for each of a set of vertices associated with a number of different image elements or image objects to be displayed on the screen 34, including vector data defining one or more roads or road segments or other image objects having relatively long expanses of straight lines associated therewith. More particularly, the vector data for each straight line or road image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as one or more vertex attribute values and/or an attribute reference pointing to or defining a set of vertex attribute values. In the case of roads, one or more of the vector attribute values may define a pixel color value associated with the interior or inside of the line or road, a width of the line to illustrate as a road, etc. Each vertex data point may additionally include other information, such as an object type identifier that identifies the type of image object with which the vertex data point is associated.

Figure 3:
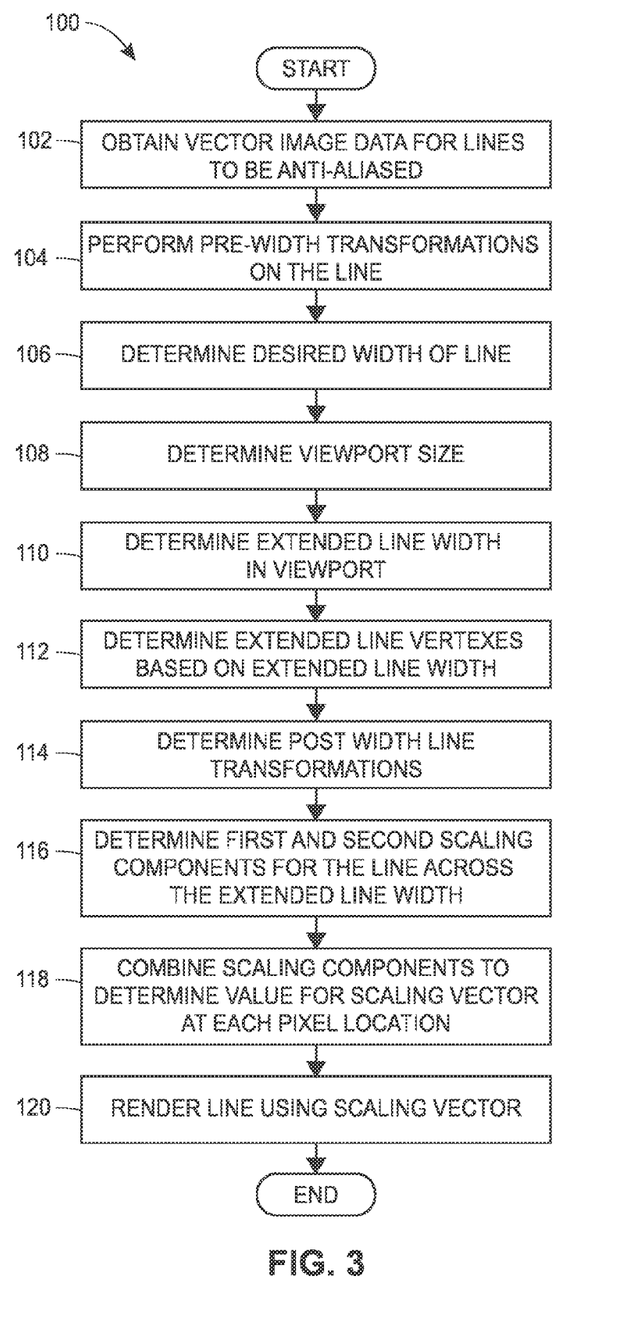
FIG. 3 illustrates an example method, routine or process flow diagram that performs an anti-aliasing technique on straight line road image object.

FIG. 3 illustrates a process diagram or a flow chart of a routine or a method 100 that may be implemented to perform anti-aliasing of an image object, such as a straight line used to indicate a road on an image being rendered on, for example, one of the display devices 34. Generally speaking the routine 100 may be implemented to perform anti-aliasing of any image object that is rendered as a line of a constant or of a predefined width, such as is typical with road segments rendered in a map image. Thus, while the description provided below performs anti-aliasing with respect to straight lines forming roads or road segments in a map image, the disclosed anti-aliasing technique could be applied to other types of image objects in map images and/or to image objects in other types of images including images that are not map images, so long as the images use vector data for objects that have lines of predetermined or constant thickness.

As illustrated in FIG. 3, the routine 100 includes a block 102 that first obtains vector image data for straight lines to be anti-aliased when being rendered within an image. The block 102 may obtain vector image data in the form of an image object, such as a road image object, that defines a straight line or a straight line segment of some predetermined or generally constant thickness. The thickness of the line will also be referred to below as the width of the line or of the road being depicted by the line and this width is defined in the direction normal to the line (i.e., normal to the straight edges of the line). If desired, the image rendering system 40 implementing the routine 100 may receive the vector image object data from the map database 12 or may obtain this data from the memory 49 of the image rendering system 40. The rendering system 40 may provide the vector data for the lines to be rendered, for example, as a road having lines of constant thickness, to an image shader, such as one of the vertex shaders 44, wherein vertex attributes of the image object provide or define the coordinates of the lines to be rendered. In this case, the lines may be sent as vertex data points defining two or more triangles making up a rectangle for each line segment, but with the rectangle having zero initial thickness. In addition, vertex attributes can be set or sent with the vector image object data that define the normal to the line, the desired width of the line, values that can be used to determine if particular vertices of the rectangle are above or below the line, and a pixel color value defining the color or pixel color value of the pixels falling within the bounds of the line, when rendered. Of course, any other data needed or used by the vertex shader 44 can be sent, stored and obtained as part of the vector image object data.

Next, a block 104 performs any pre-width transformations on the line or the vertex data defining the line that need to be performed on the image object. More particularly, the vertex shader 44 may apply various transformation matrices to the vertex points of the line before the width of the line is computed or determined. It is important for the anti-aliasing technique described herein that certain of the transformations, e.g., those that do not effect or transform the width characteristics of the line, be applied to the line or the vertexes defining the line prior to the width of the line being calculated and determined. For example, the transformations associated with the orientation of the line on the image screen may need to be performed prior to the anti-aliasing routine described herein being applied. However, other transformations may need to be applied after the width of the line is calculated or determined, such as transformations that determine the edges of the line and pixel values for pixels at or near the edges of the line. As a general matter, the vertex shader 44 may compute the transformed data points using any transformations that are to be applied before the width of the line is computed, and these same transformations may be applied to the normal of the line, so that the line is normalized to the image or screen size in which the line is to be rendered.

Next, a block 106 determines, e.g., computes, the width of the line, as defined by the image object data or as computed by the map application program 48 based on desired display features or characteristics of the line to be displayed. This width may be used to define the locations of the vertices of the triangles defining the line. At this point, the triangles for the image object, e.g., the road, define a line of constant and predefined width (in the direction to the normal of the line) and anti-aliasing can be performed.

To perform anti-aliasing, a block 108, which may be performed in the vertex shader 44, first transforms the vertex coordinates of the line into viewport coordinates. This operation requires knowing the size of the viewport, which could be passed to the vertex shader 44 as a uniform variable. As an example only, the viewpoint coordinates may be obtained for one side of a line defined by a set of vertex points by dividing the computed coordinate by its perspective (also referred to as width) component, adding one to the x component, subtracting the y component from one, and multiplying by half of the viewport size to get the viewport coordinates. Using the same technique, the vertex shader 44 can compute the viewport coordinates for the vertices on the other side of the line. The distance between these vertices gives the true width of the line after vertex transformations.

Figure 4:
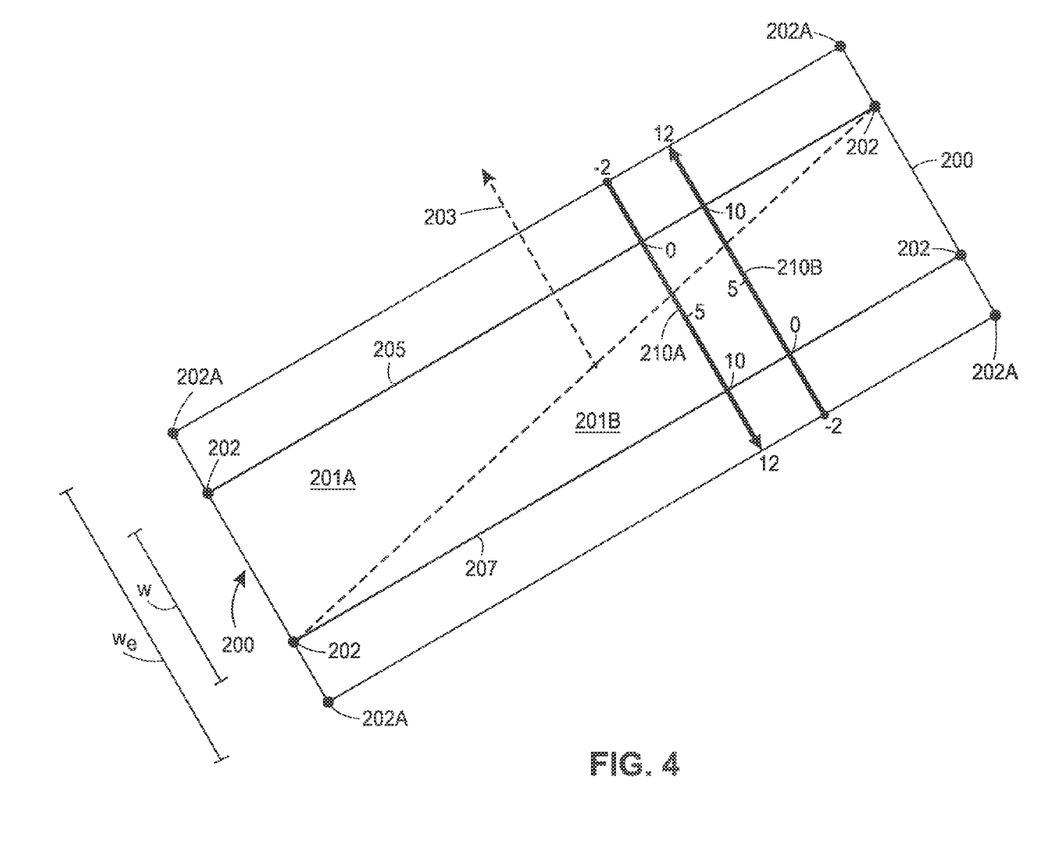
FIG. 4 is a depiction of a portion of a straight line of a road including two scaling components used to determine a scaling vector to perform anti-aliasing in the image rendering process of FIG. 3.

Referring to FIG. 4, a line 200 defining a road segment is illustrated as being made up of a set of triangles 201A and 201B defining a rectangle bounded by four vertices 202, the rectangle having a constant width was measured in the direction normal to the line 200. A normal 203 to the line 200 is illustrated by a dotted line in FIG. 4. The constant width w, which in this case may be the width of the line (or road) as transformed into the viewport of the image space, is generally defined by the vector image data for this image object. While the line 200 is illustrated as being disposed at an angle to a horizontal, the line 200 could be disposed in any direction or orientation on the image screen, and it will be understood that all line width and line edge length dimensions are defined herein with respect to the normal 203 of the line 200. Thus, the width w of the line 200, as described herein and as illustrated in FIG. 4, is in the direction of the normal 203 while upper and lower edges 205 and 207, respectively, of the line 200 extend perpendicularly to the normal 203.

Once the line vertices 202 are converted to the viewport coordinates, a block 110 of FIG. 3 determines an extended width of the line within the viewport, wherein this extended line width $w_e$ (defined in the direction of the normal 203) will be used to perform anti-aliasing of the line. Generally speaking, the extended line width $w_e$ of the line 200 will be used to extend the vertices 202 of the line 200 in equal amounts on both sides of the line 200, i.e., in the direction of the normal 203 and in the direction opposite to the normal 203, to provide for an extended line width over which a scaling vector will be applied to each column of pixels along the length of the line 200 to determine pixel color values for the line 200. The extended line width $w_e$ can be determined, for example, as a percentage of the original line width w within the viewport, a certain number of pixels on either side of the line 200, or in any other desired manner.

A block 112 then determines extended line vertices 202A to define a bounding box over which a scaling vector will be computed and applied to the line 200 to perform anti-aliasing. Extended vertices 202A are illustrated in FIG. 4 for the line 200 and these extended vertices 202A have been determined extending from the edges of the line 200 in the direction normal to the line 200 (and opposite to the normal to the line 200) a preset percentage (e.g., ⅕) of the width of the line 200.

Next, if needed, a block 114 of FIG. 3 determines post-width line transformations on the vertices 202 and/or 202A of the line 200. The post-width line transformations are those transformations that may be needed to be performed on the line width coordinates as they need to be applied to the width of the line as well as to other aspects of the line 200.

In any event, blocks 116 and 118 may be used to determine a scaling vector for the line 200 to be used when rendering the line 200 to perform anti-aliasing. More particularly, this scaling vector, once computed, is used to determine the pixel color values within the bounding box defined by the extended vertices 202A so as to render the line 200 in a manner that performs anti-aliasing. While the scaling vector may be calculated in any number of manners, the general purpose of the scaling vector is to provide a scale disposed normal to the line 200 that indicates how much of the pixel color value of the line to use at each pixel position along the normal to the line (for each pixel column of the line along the length of the line) to calculate pixel color values at each such pixel position. More particularly, the scaling vector is formed such that pixels at pixel locations firmly within the original bounds or edges 205 and 207 of the line 200 are rendered using the pixel color value of the line, that pixels at pixel locations firmly outside of the original bounds or edges 205 and 207 of the line 200 are rendered such that a non-line pixel color value is used at these pixel locations, and such that pixels near the original edges 205 and 207 of the line 200 use scaled pixel color values depending on how close a particular pixel is to one of the edges 205 and 207 of the line 200. This scaling vector is used by a fragment shader 46 to determine a pixel color value for each pixel within the bounding box defined by the vertices 202A to perform anti-aliasing. In one instance, the pixels near the edges 205 and 207 of the line 200 (e.g., both outside the line 200 and inside the line 200) are scaled in value based on their distance from the edge of the line 200.

To compute the scaling vector, the block 116 determines first and second scaling components 210A and 210B for the line 200, wherein the scaling components 210A and 210B span the extended line width $w_e$ defined by the vertices 202A in the direction of the normal 203 but do so in opposite directions. Example scaling components 210A and 210B are illustrated with thicker lines in FIG. 4 and, as will be seen, the scaling component 210A extends from the upper edge of the bounding box defined by the vertices 202A to the lower edge of the bounding box defined by the vertices 202A while the scaling component 210B extends from the lower edge of the bounding box defined by the vertices 202A to the upper edge of the bounding box defined by the vertices 202A. Thus, the scaling components 210A and 210B extend from a certain distance outside of one side of the original line 200, through the edges 205 and 207 of the line 200 and to a position that is located the certain distance outside of but on the other side of the original line 200.

If desired, the scaling components 210A and 210B may be formed by forming a box or extending the vertices 202 of the line 200 by a certain amount in each direction, based on, for example, the width w of the line 200. Thus, for example the vertices 202A may be formed as extending the vertices 202 in each direction above and below the line 200 in the direction of the normal 203 to the line 200 (for the vertices above the line 200) and in the direction opposite to the normal 203 of the line 200 (180 degrees from the direction of the normal) for the vertices below the line 203.

Now, values for different locations along the scaling components 210A and 210B may be determined or set dependent on the particular location along the normal 203 to the line 200 at which the scaling component is analyzed. In one example, the value of the components 210A and 210B may vary linearly from a first value to a second value. If desired, the first value may be a negative number and the second value may be a positive number with the value being zero at one of the edges 205 or 207 of the line 200. In a more particular example, the values of the scaling components 210A and 210B at any location along these components may be a pixel count or a pixel distance defining the distance that that location is away from one of the edges 205 or 207. For example, as illustrated in FIG. 4, the values of the scaling component 210A may start at the upper edge of the bounding box formed by the extended vertices 202A and end at the lower edge of the bounding box formed by the extended vertices 202A, and the values of the scaling component 210A may be set as a measure of the distance away from the edge 205. In the example of FIG. 4, the line width w is illustrated as being 10 and so the values of the scaling component 210A range from −2 to 12 Likewise, the values of the scaling component 210B may start at the lower edge of the bounding box formed by the extended vertices 202A and end at the upper edge of the bounding box formed by the extended vertices 202A and the values of the scaling component 210B may be set as a distance away from the edge 207. In the example of FIG. 4, the values of the scaling component 210B range from −2 to 12 in the direction opposite to those of the component 210A. In this example, the values of the scaling components 210A and 210B are equal in the center of the line 200. While the scaling components 210A and 210B are illustrated in FIG. 4 as being located at different places along the length of the line 200, this is done for illustration only, as the scaling components 210A and 210B do not have any particular association with locations along the length of the line 200.

In one case, the vertices 202A may be extended by a fixed number of pixels on either side of the line 200, e.g. two pixels, or may be extended by a number of pixels based on the width of the line, e.g., one fifth of the line width. In either case, in the illustration of FIG. 4, the components 210A and 210B have values that start at −2 and extend to 12, but increase along the components in opposite directions. Moreover, in this example, the scaling component values at the edges 205 and 207 of the original line 200 are either 0 or 10 for each of the scaling components 210A and 210B.

Figure 5A:
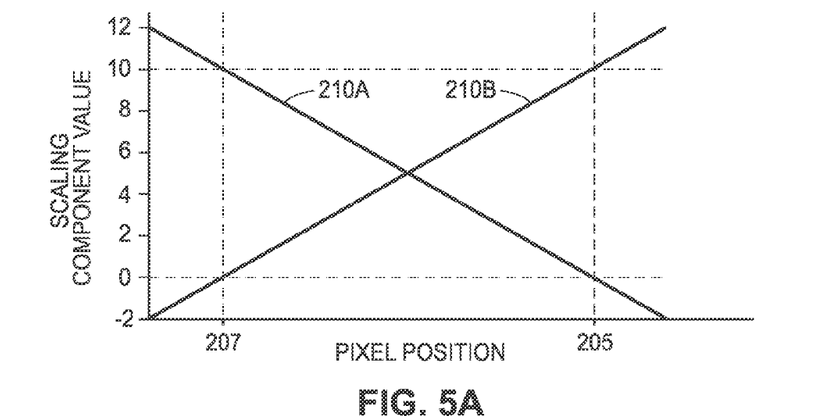
FIGS. 5A-5D are graphs depicting the development of a scaling vector to be used to perform anti-aliasing using the scaling components illustrated in FIG. 4.

After the block 116 determines the scaling components 210A and 210B, a block 118 determines the scaling vector by combining the values of the two scaling components 210A and 210B at each position along the components 210A and 210B so as to produce a single scaling vector having a value at each pixel position along the normal 203 to the line 200. FIGS. 5A-5D illustrate one manner of combining the scaling components 210A and 210B to produce a scaling vector. In particular, FIG. 5A illustrates a graph indicating the value of each of the scaling components 210A and 210B with the x axis of the graph of FIG. 5A starting at a pixel position at the bottom or lower edge of the bounding box formed by the extended vertices 202A and extending along the normal 203 of the line 200 to the upper edge of the bounding box formed by the extended vertices 202A. In this graph, the vertical dotted lines illustrate the locations of the edges 205 and 207 of the original line 200.

Figure 5B:
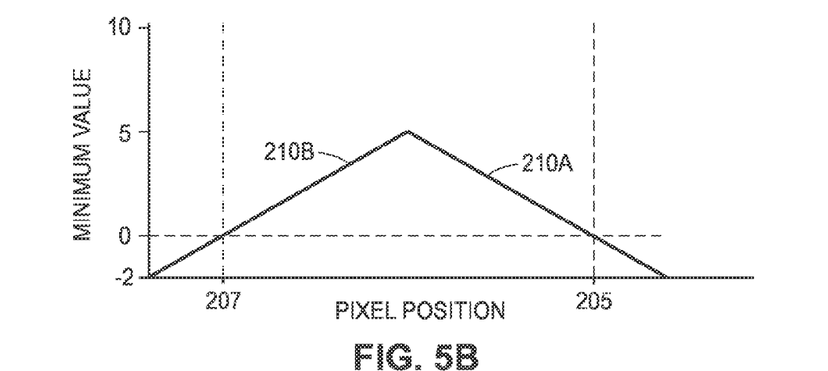

In one example, the block 118 may combine the two scaling components 210A and 210B by first determining the minimum value of the two scaling components 210A and 210B at each position or location along these components (e.g., in the direction of the normal 203 to the line 200). This operation is illustrated in FIG. 5B which results in a single value at each of the pixel positions along the normal 203 of the line 200 (again illustrated along the x axis or the bottom of the graph of FIG. 5B). Additionally, during the combining process, the block 118 may limit or clamp the minimal values determined in FIG. 5B to be, for example, between −0.5 and 0.5, so that any value that is below −0.5 is clamped to −0.5 and so that any value that is above 0.5 is clamped to 0.5. Of course, values between −0.5 and 0.5 will remain the same. The effects of such a clamping routine are illustrated in FIG. 5C.

Figure 5C:
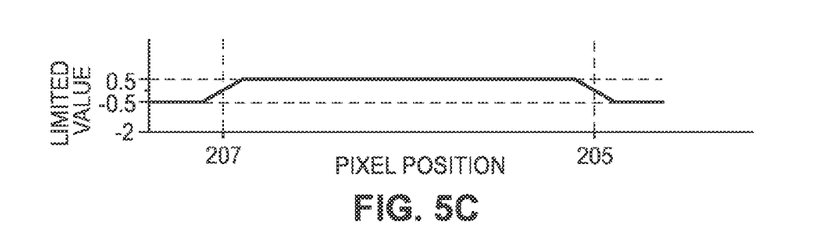
Figure 5D:
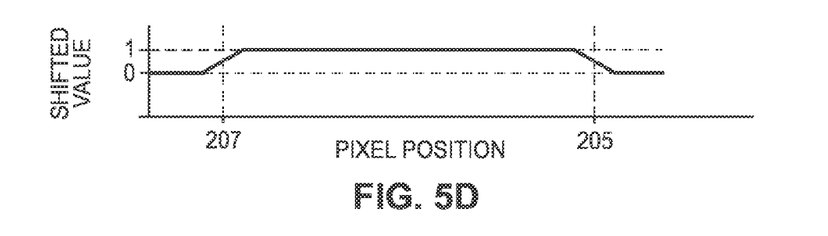

Next, the block 118 may shift or translate the entire line of FIG. 5C up by 0.5 (i.e., 0.5 can be added to each value of the line of FIG. 5C) to produce a scaling vector as illustrated in FIG. 5D. The scaling vector of FIG. 5D can then be applied to the pixels across the width of the bounding box formed by the set of extended vertices 202A so as to perform anti-aliasing when rendering the line 200. In particular, the values of the scaling vector of FIG. 5D range from 0 to 1 and can be used to define a percentage of the pixel color value of the line (as defined by the original set of vector data, for example) to use at any particular pixel within the set of extended vertices 202A. In effect, the color values of the pixels that are far inside of the bounds or edges 205 and 207 of the original line 200 will be determined as the pixel color value of the line multiplied by 1 or 100 percent, resulting in a pixel color value that is equal to the pixel color value of the line. Likewise, the color values of the pixels that are far outside of the bounds or edges 205 and 207 of the original line 200 will be determined as the pixel color value of the line multiplied by 0, resulting in a pixel color value that is equal to the color of a non-line or non-road location. However, pixels near the edges 205 and 207 of the original line 200 (both inside and outside of those edges) will be multiplied by a scaling component value between 0 and 1, depending on how close these pixels are to the center of the original line (i.e., the closer to the center of the original line 200, the higher the scaling vector value that is used.)

Referring again to FIG. 3, a block 120 renders the line using the values of the scaling vector by multiplying the value of the scaling vector at each pixel position along the normal to the line by the pixel color value of the line. If desired, the block 120 (as well as the block 118 if so desired) can be performed in a fragment shader 46 by applying the determined scaling vector across the entire set of pixels within the bounding box defined by the vertices 202A, so as to gradually increase the pixel color values near the edges of the line 200 starting from a point outside of the original edges 205 and 207 of the line 200 to a point inside of the original edges 205 and 207 of the line 200 to provide for less abrupt changes in the pixel color values at the edges of the line being rendered. This effect, in turn, reduces aliasing when the line is drawn at any angle within the viewport.

Of course, the method of determining a scaling vector that is illustrated in and described with respect to FIGS. 4 and 5 is just one example of a manner of determining a scaling vector for use in applying to determine the pixel color values at or near edges of a line to perform anti-aliasing, and it will be understood that other scaling vectors can be determined and used as well. For example, in another case, a scaling factor may be determined to be, for example, one-half of the inverse square root of the width w of the line 200. Upon obtaining the scaling factor, the vertex shader 44 may obtain two scaling components having varying values, with each of these two components ranging linearly in value from the negation of the scaling factor to three times the scaling factor plus the square root of the width w of the line 200. Of course, similar to FIG. 4, the values of the scaling components range in opposite directions with respect to the normal of the line. This numbering has the effect of scaling one component linearly from −S (where S is the scaling factor), to 3*S+sqrt(W) from the top to the bottom of the line, and of scaling the other component from 3*S+sqrt(W) to −S from the top to the bottom of the line.

In this case, the fragment shader 46 (or the vertex shader 44 if so desired) may combine the two scaling components by multiplying the values of the two scaling components together (on a location by location basis) to produce the scaling vector. If the value of the scaling vector is zero or less at a particular pixel location along the normal to the line 200, the line is not drawn at that pixel location (i.e., the pixel color value is set to be a non-line pixel color value). If the value of the multiplied component or scaling vector at a particular pixel location one or more, the line is drawn fully at that pixel value (i.e., the pixel color value is set to be the line pixel color value). If the value of the scaling vector at a particular pixel is between zero and one, the value of the scaling vector at that particular location is used as a percentage of the line pixel color value to be drawn at that pixel, and can be used to determine the percentage of the pixel color value of the line to be rendered at that pixel location to perform anti-aliasing. In one example, the two components have the property that their product will be between zero and one for only 1 viewport pixel on either side of the line 200, and will be one for the desired width of the line.

As an example of this technique, if the line has a width of 4 and has no transformations applied, the scaling factor is computed as ¼. The two scaling components will thus vary from negative ¼ to 2¾, and from 2¾ to negative ¼. Ten percent (10%) of the way through the line (in the direction of the normal to the line) these components would interpolate to 0 and 2.5 yielding a product of zero. Twenty percent (20%) of the way through the line in the direction of the normal to the line, these components interpolate to 0.25 and 2.25, yielding a product of 0.5625. Thirty percent (30%) of the way through the line in the direction of the normal to the line, these components interpolate to 0.5 and 2, yielding a product of 1. Seventy percent (70%) of the way through the line in the direction normal to the line, these components interpolate back down to values that produce a product of one. Using this factor, twenty percent of the line on either side of the line is anti-aliased, and forty percent of the line is solid. If the line is drawn over five pixels, in the direction normal to the line, the line will be four pixels wide with one pixel of anti-aliasing on either side. In such a case, it may be desirable to push the extended vertices a half of a pixel further from the line in the vertex shader in order to accomplish better anti-aliasing. Of course, while two specific manners of computing and combining scaling components are described herein, other manners of developing and combining scaling components can be used to develop a scaling vector, and other manners of developing scaling vectors can be used as well.

Thus, if for example, anti-aliasing is not provided by an OpenGL implementation, it may be important to anti-alias lines to be rendered in an image. To do so, the system first computes the vertices for triangles covering the lines of a road or other lines of constant thickness in a vertex shader so that the vertex shader can render the lines with widths that are independent of some transformations, but dependent on others. The system then computes a pair of carefully crafted scaling components which can be combined to interpolate across the line so as to be able to perform anti-aliasing of the line with minimal additional processing cost or time. Using the technique described herein for applying anti-aliasing to lines in an OpenGL shader, the lines remain constant width regardless of some transformations, but change width based on other transformations.

Of course, the anti-aliasing techniques described herein may be altered or varied in any number of manners to provide an image rendering system, such as a map rendering system, having the ability to efficiently render individual lines with sufficient anti-aliasing to produce a pleasing rendering of a line at any orientation.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is performed merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for rendering a straight line image object on a display device, comprising:
    receiving at a computer device line vector image data identifying a straight line to be rendered within an image on a display device;
    determining, using a computer device, a desired width for the straight line based on the line vector image data, the desired width of the straight line being determined in the direction normal to the straight line;
    determining, using a computer device, an extended width of the straight line to be used in anti-aliasing the straight line when the straight line is rendered in the image on the display device, the extended width of the straight line being determined in the direction of the normal to the straight line and extending the width of the straight line equally on either side of the straight line;
    determining one or more preliminary scaling vectors, the values of which are linearly related to the distance from the center of the straight line in the direction of the normal to the straight line over at least a portion of the extended width of the straight line;
    determining a scaling vector to be applied to pixel positions along the normal to the straight line within the extended width of the straight line, wherein the scaling vector is derived from the one or more preliminary scaling vectors such that the scaling vector has a value that differs from the value of each of the one or more preliminary scaling vectors for at least one distance from the center of the straight line;
    using the scaling vector to determine a pixel value for each of the pixel positions along the normal to the straight line within the extended width of the straight line; and
    rendering, using the computer device, the straight line in the image on the display device using the determined pixel values at each of the pixel positions along the normal to the straight line within the extended width of the straight line.

2. The computer-implemented method of claim 1, wherein using the scaling vector to determine a pixel value for each of the pixel positions along the normal to the straight line within the extended width of the straight line includes multiplying a component of the scaling vector by a pixel value for a pixel within boundaries of the straight line to determine the pixel value at a particular pixel position.

3. The computer-implemented method of claim 1, wherein determining a scaling vector includes determining first and second scaling components extending normal to the straight line but in opposite directions, wherein each of the first and second scaling components has values that range linearly from a finite first value to a finite second value, and further including combining the first and second scaling components to produce the scaling vector.

4. The computer-implemented method of claim 3, wherein combining the first and second scaling components includes determining a minimum value of the first and second scaling components at each of a set of locations along the first and second scaling components.

5. The computer-implemented method of claim 4, wherein combining the first and second scaling components further includes limiting the determined minimum value at each of the set of locations along the first and second scaling components between a high value and a low value.

6. The computer-implemented method of claim 5, wherein the high value is 0.5 and the low value is −0.5.

7. The computer-implemented method of claim 5, wherein combining the first and second scaling components further includes translating the minimized, limited minimum values at each of the set of locations by a predetermined amount to produce the scaling vector.

8. The computer-implemented method of claim 7, wherein the predetermined amount is 0.5.

9. The computer-implemented method of claim 3, wherein determining the first and second scaling components extending normal to the straight line but in opposite directions includes assigning values to the first and second scaling components ranging from a first pre-determined amount at the start of each of the first and second scaling component to a second predetermined amount at the end of each of the first and second scaling components.

10. The computer-implemented method of claim 9, wherein the first predetermined amount is a negative number and the second predetermined amount is a positive number.

11. The computer-implemented method of claim 3, wherein determining the first and second scaling components extending normal to the straight line but in opposite directions includes determining a scaling factor and assigning values to the first and second scaling components based on the scaling factor and the width of the straight line.

12. The computer-implemented method of claim 11, wherein assigning values to the first and second scaling components including assigning values to each of the first and second scaling components ranging from the negation of the scaling factor to three times the scaling factor plus the square root of the width of the straight line.

13. The computer-implemented method of claim 12, wherein the scaling factor is one-half of the inverse square root of the width of the straight line.

14. The computer-implemented method of claim 11, wherein combining the first and second scaling components to produce the scaling vector includes multiplying the values of the first and second scaling components at each of the set of locations along the first and second scaling components to produce a scaling vector component at each of the set of locations.

15. The computer-implemented method of claim 14, wherein combining the first and second scaling components to produce the scaling vector includes limiting the values of the multiplied values of the first and second scaling components at each of the set of locations along the first and second scaling components to be between zero and one.

16. The computer-implemented method of claim 1, further including performing, using the computer device, one or more transformations on the line vector image data prior to making a determination of a width of the straight line to be rendered in the image on the display device.

17. The computer-implemented method of claim 16, further including performing, using the computer device, one or more transformations on the line vector image data after determining the extended width of the straight line.

18. An image rendering engine, comprising:
a communications network interface;
a processor;
a memory coupled to the processor;
a display device coupled to the processor;
a first routine, stored in the memory, that executes on the processor to receive, via the communications network interface, a set of vector data comprising data defining one or more straight line image objects;
a second routine, stored in the memory, that executes on the processor to determine an extended width of the straight line to be used in anti-aliasing the straight line when the straight line is rendered in the image on the display device, the extended width of the straight line being determined in the direction of the normal to the straight line and extending the width of the straight line equally on either side of the straight line;
a third routine, stored in the memory, that executes on the processor to determine a scaling vector to be applied to pixel positions along the normal to the line within the extended width of the straight line, wherein determining the scaling vector comprises:
determining one or more preliminary scaling vectors, the values of which are linearly related to the distance from the center of the straight line in the direction of the normal to the straight line over at least a portion of the extended width of the straight line; and
derive the scaling vector from the one or more preliminary scaling vectors such that the scaling vector has a value that differs from the value of each of the one or more preliminary scaling vectors for at least one distance from the center of the straight line;
a fourth routine, stored in the memory, that executes on the processor to use the scaling vector to determine a pixel value for each of the pixel positions along the normal to the straight line within the extended width of the straight line; and
a fifth routine, stored in the memory, that executes on the process to render the straight line in the image on the display device using the determined pixel values at each of the pixel positions along the normal to the straight line within the extended width of the straight line.

19. The image rendering engine of claim 18, wherein the second and third routines are performed in a vertex shader.

20. The image rendering engine of claim 18, wherein the fourth and fifth routines are performed in a fragment shader.

21. The image rendering engine of claim 18, wherein the fourth routine uses the scaling vector to determine a pixel value for each of the pixel positions along the normal to the straight line within the extended width of the straight line by multiplying a component of the scaling vector by a pixel value for a pixel within boundaries of the straight line to determine the pixel value at a particular pixel position.

22. The image rendering engine of claim 18, wherein the third routine determines first and second scaling components extending normal to the straight line but in opposite directions, wherein each of the first and second scaling components have values that range linearly from a finite first value to a finite second value, and further combines the first and second scaling components to produce the scaling vector.

23. The image rendering engine of claim 22, wherein the third routine combines the first and second scaling components by determining a minimum value of the first and second scaling components at each of a set of locations along the first and second scaling components.

24. The image rendering engine of claim 22, wherein the third routine combines the first and second scaling components by multiplying the values of the first and second scaling components at each of the set of locations along the first and second scaling components to produce a scaling vector component at each of the set of locations.

25. The image rendering engine of claim 24, wherein the third routine combines the first and second scaling components to produce the scaling vector by limiting the values of the multiplied values of the first and second scaling components at each of the set of locations along the first and second scaling components to be between zero and one.

26. The image rendering engine of claim 24, wherein the third routine determines a scaling factor as one-half of the inverse square root of the width of the straight line and the third routine assigns values to the first and second scaling components by assigning values to each of the first and second scaling components ranging from the negation of the scaling factor to three times the scaling factor plus the square root of the width of the straight line.

27. A method of rendering a straight line within an image being rendered on a display device, comprising:
receiving vector image data identifying a straight line to be rendered within the image on the display device, the vector image data including a pixel value indicative of a pixel color value for pixel positions within the straight line;
determining a desired width of the straight line in the direction normal to the edges of the straight line;
determining one or more preliminary scaling vectors, the values of which are linearly related to the distance from the center of the straight line in the direction of the normal to the straight line over at least a portion of the extended width of the straight line;
determining a scaling vector to be applied to pixel positions along the normal to the line within the extended width of the straight line, wherein the scaling vector is derived from the one or more preliminary scaling vectors such that the scaling vector has a value that differs from the value of each of the one or more preliminary scaling vectors for at least one distance from the center of the straight line;

using the scaling vector and the pixel value indicative of a pixel color value for pixel positions within the straight line to determine a pixel color value for each of the pixel positions along the normal to the straight line near the edges of the straight line; and rendering the straight line in the image on the display device using the determined pixel values at each of the pixel positions along the normal to the straight line near the edges of the straight line.

28. The method of rendering a straight line within an image of claim 27, wherein determining a scaling vector to be applied to pixel positions along the normal to the straight line near the edges of the straight line edges includes determining an extended width of the straight line to be used in anti-aliasing the straight line when the straight line is rendered in the image on the display device and determining the scaling vector so as to be applied to pixel positions along the normal to the line within the extended width of the straight line.

29. The method of rendering a straight line within an image of claim 27, wherein using the scaling vector and the pixel value indicative of a pixel color value for pixel positions within the straight line to determine a pixel color value for each of the pixel positions along the normal to the straight line near the edges of the straight line includes multiplying a component of the scaling vector by the pixel value indicative of a pixel color value for pixel positions within the straight line for each of a set of pixels near the edges of the straight line to determine the pixel color value at each of the set of pixels near the edges of the straight line.

30. The method of rendering a straight line within an image of claim 27, wherein determining a scaling vector to be applied to pixel positions along the normal to the straight line near the edges of the straight line includes determining first and second scaling components extending normal to the straight line but in opposite directions, wherein each of the first and second scaling components has values that range linearly from a finite first value to a finite second value, and further including combining the first and second scaling components to produce the scaling vector.

31. The method of rendering a straight line within an image of claim 30, wherein combining the first and second scaling components includes determining a minimum value of the first and second scaling components at each of a set of locations along the first and second scaling components.

32. The method of rendering a straight line within an image of claim 31, wherein combining the first and second scaling components further includes limiting the determined minimum value at each of the set of locations along the first and second scaling components between a high value and a low value.

33. The method of rendering a straight line within an image of claim 32, wherein combining the first and second scaling components further includes translating the minimized, limited minimum values at each of the set of locations by a predetermined amount to produce the scaling vector.

34. The method of rendering a straight line within an image of claim 30, wherein determining the first and second scaling components extending normal to the straight line but in opposite directions includes assigning values to the first and second scaling components ranging from a first pre-determined amount at the start of each of the first and second scaling component to a second predetermined amount at the end of each of the first and second scaling components, wherein the first predetermined amount is a negative number and the second predetermined amount is a positive number.

35. The method of rendering a straight line within an image of claim 30, wherein determining the first and second scaling components extending normal to the straight line but in opposite directions includes determining a scaling factor and assigning values to the first and second scaling components based on the scaling factor and the width of the straight line.

36. The method of rendering a straight line within an image of claim 35, wherein assigning values to the first and second scaling components including assigning values to each of the first and second scaling components ranging linearly from the negation of the scaling factor to three times the scaling factor plus the square root of the width of the straight line.

37. The method of rendering a straight line within an image of claim 36, wherein the scaling factor is one-half of the inverse square root of the width of the straight line.

38. The method of rendering a straight line within an image of claim 35, wherein combining the first and second scaling components to produce the scaling vector includes multiplying the values of the first and second scaling components at each of a set of locations along the first and second scaling components to produce a scaling vector component at each of the set of locations.

39. The method of rendering a straight line within an image of claim 38, wherein combining the first and second scaling components to produce the scaling vector includes limiting the values of the multiplied values of the first and second scaling components at each of the set of locations along the first and second scaling components to be between zero and one.

* * * * *